Dec. 11, 1923.
H. R. McCONNELL
CHUCK
Filed Feb. 7, 1923
1,476,903
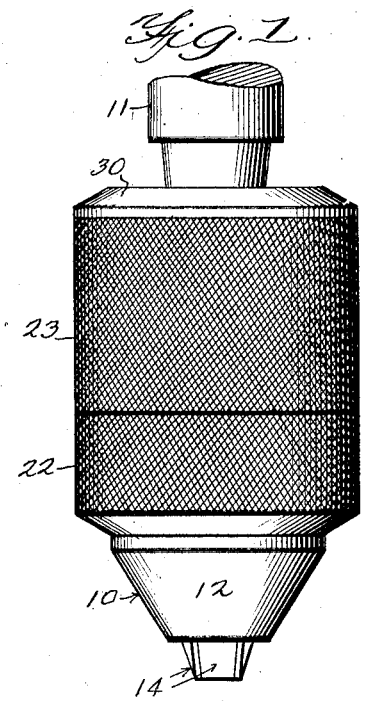
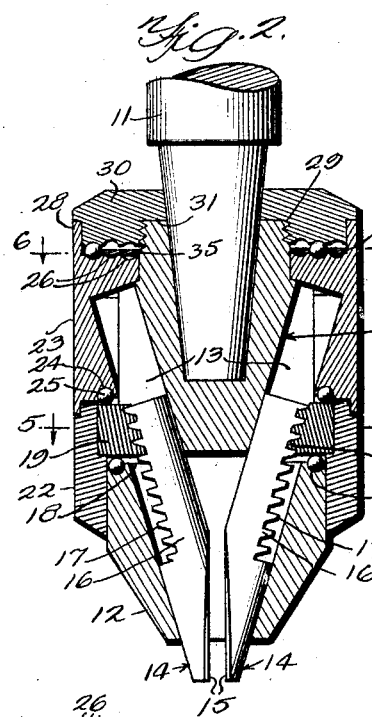
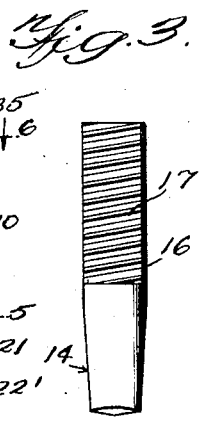
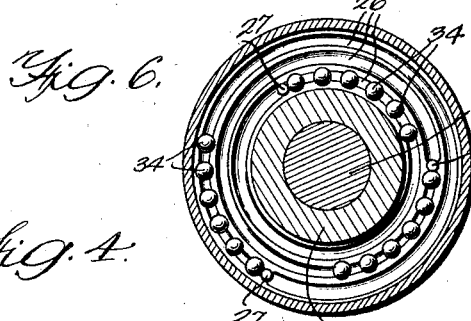
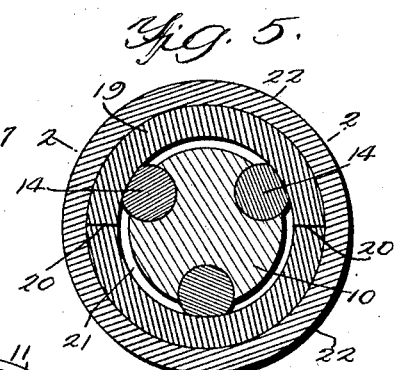
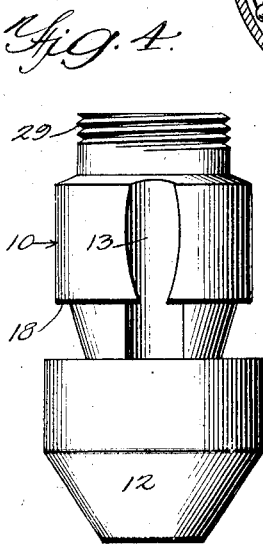
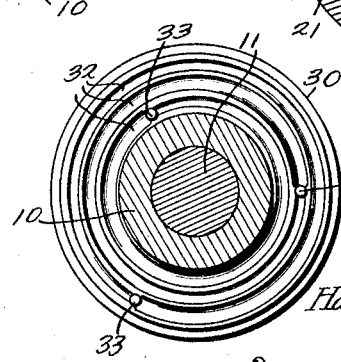
Inventor
Harry R. McConnell,
By
Attorney Patented Dec. 11, 1923.

1,476,903

UNITED STATES PATENT OFFICE.

HARRY R. McCONNELL, OF RICHMOND, VIRGINIA, ASSIGNOR TO THE McCONNELL-BROWNING ENGINEERING COMPANY, OF RICHMOND, VIRGINIA, A CORPORATION OF VIRGINIA.

CHUCK.

Application filed February 7, 1923. Serial No. 617,592.

*To all whom it may concern:*

Be it known that I, HARRY R. McCONNELL, a citizen of the United States, residing at Richmond, in the county of Henrico and State of Virginia, have invented certain new and useful Improvements in Chucks, of which the following is a specification.

This invention relates to chucks and more particularly to such a device wherein gripping elements are provided and adapted to be clamped about the shank of a tool, the device being provided with actuating means whereby the gripping elements may be easily and rapidly advanced into loose engagement with the tool, supplementary means being provided for tightly clamping the gripping elements about the tool without the use of a wrench.

In the chucks now commonly employed a plurality of gripping elements are employed which incline downwardly and inwardly and have their outer faces provided with threads engaged by an internally threaded rotatable ring whereby they may be moved into engagement with the tool. It is the common practice with such devices to rotate the ring rapidly by hand until the gripping elements loosely engage the tool, whereupon a wrench is applied to the ring to secure a tight gripping action. In such chucks but a single actuating means is employed for moving the gripping elements, and if the threads employed are of slight pitch so that the tool may be tightly clamped with little likelihood of becoming loose during the operation of the chucks, it requires a number of turns of the sleeve to move the gripping elements a relatively short distance inwardly toward the shank of the tool with a consequent loss of time. It is the usual practice therefore to provide relatively high pitch threads whereby the gripping elements may be rapidly moved into engagement with the tool but the use of such a construction results in the frequent loosening of the gripping elements.

In my copending applications Serial Numbers 591,536, filed September 30, 1922, and 599,587, filed November 7, 1922, I have disclosed chucks having actuating rings for moving the clamping elements into engagement with the tool wherein high pitch threads are employed for rapidity in action, the rings being adapted to partake of limited longitudinal movement, auxiliary means being provided for moving the rings longitudinally to tightly clamp the gripping elements in position without danger of becoming loose during operation of the chuck. The chuck forming the subject matter of the present invention is an improvement over those shown in my copending applications above mentioned, being simple in construction and cheap to manufacture, and being so designed that the supplementary clamping means may be readily and efficiently operated to tighten the gripping elements about the tool without the use of a wrench or similar implement.

From the foregoing it will be seen that an important object of the present invention is to provide main actuating means for moving the clamping elements into loose engagement with the tool and to provide novel means for tightly clamping the gripping elements about the tool, antifriction means being employed whereby an extremely tight clamping action may be obtained by manual operation without the use of tools of any kind.

Other objects and advantages of the invention will be apparent during the course of the following description.

In the drawings, I have shown one embodiment of the invention. In this showing,

Figure 1 is a side elevation of a chuck embodying the invention,

Figure 2 is a central longitudinal sectional view taken substantially on line 2—2 of Figure 5, Figure 3 is a detail view of one of the clamping elements, Figure 4 is a side elevation of the body portion of the device, Figure 5 is a section taken on line 5—5 of Figure 2, Figure 6 is a section taken on line 6—6 of Figure 2, and, Figure 7 is a view similar to Figure 6 looking in the opposite direction.

Referring to the drawings the numeral 10 designates the body portion of the device as a whole mounted upon a rotatable spindle 11 driven by a drill press or other machine. The body portion terminates in a tapered lower end 12 and is provided with a plurality of downwardly converging openings 13 in which are mounted gripping elements designated as a whole by the reference numeral 14. The gripping elements are provided with clamping faces 15 as shown in Figure 2. The upper ends 16 of the gripping elements are reduced as shown and are provided with relatively high pitch threads 17 as clearly shown in Figures 2 and 3.

The body portion 10 is provided intermediate its ends with an annular groove 18 communicating with the openings 13 as shown in Figures 2 and 4. A ring 19 is mounted in the groove 18, being split as at 20 to permit it to be placed in the groove when the device is assembled. The ring 19 is provided with internal threads 21 engaging the threads 17 of the clamping element. A sleeve 22 surrounds the ring 19 as shown in Figure 2, having a driving fit therewith whereby rotation of the sleeve will cause rotation of the ring 19 to move the gripping elements as will be obvious. As shown in Figure 2 the ring 19 is adapted to contact with antifriction balls 22' mounted in a suitable ball race in the lower face of the groove 18.

A rotatable sleeve 23 surrounds the body portion 10 intermediate the sleeve 22 and the upper end of the body portion. The sleeve 23 is provided adjacent its lower end with a ball race 24 having antifriction balls 25 therein which contact with the upper face of the ring 19. As shown in Figure 2, the width of the ring 19 is slightly less than the distance between the sets of balls 22' and 25 whereby the ring is adapted to partake of limited longitudinal movement with respect to the body portion 10. The upper end of the sleeve 23 is provided with a plurality of concentric grooves 26 which are arcuate in cross section and vary in depth throughout their length as shown in Figures 2 and 6. Each groove 26 is provided with a stop pin 27 and these pins are preferably equidistantly spaced as shown in Figure 6. It will be seen that the grooves 26 immediately adjacent and to one side of the pins 27 are relatively shallow and increase in depth around the upper face of the sleeve 23 until they reach maximum depths adjacent the opposite sides of the pins 27, for a purpose to be described. An annular extension 28 forming a continuation of the sleeve 23 extends upwardly from the sleeve.

The upper end of the body portion is threaded as at 29 for the reception of a cap 30 having an internal shoulder 31 adapted to contact with the upper end of the body portion. When the cap 30 is placed in position it is screwed down tightly with the shoulder 31 in firm engagement with the upper end of the body portion whereby the cap forms in effect a part of the body portion. As shown in Figure 2 the lower portion of the cap is rotatably arranged within the extension 28 of the sleeve 23. As shown in Figure 7 the cap 30 is provided in its lower face with a plurality of concentric grooves 32 corresponding in number and arrangement to the grooves 26. Each groove 32 is provided with a stop pin 33 and the grooves 32 increase in depth around the face of the cap from points adjacent one side of the pins 33 to a maximum depth at points adjacent the opposite sides of these pins. When the device is assembled it will be apparent that the grooves 26 and 32 increase in depth in opposite directions. A plurality of antifriction balls 34 are mounted in each groove 26 and its corresponding groove 32 and these balls are maintained in proper spaced relation as shown in Figure 6 by a retainer plate 35 shown in Figure 2.

The operation of the device is as follows:

When it is desired to insert the shank of a tool within the gripping elements, the sleeve 23 is rotated from the position shown in Figure 6 so that the deeper portions of the grooves 26 travel toward the deeper portions of the grooves 32. When the sleeve 23 is so rotated, the pins 27 will move with the sleeve in a counterclockwise direction as seen in Figure 6, the balls traveling toward the deeper portions of the grooves 26. After the sleeve 23 has been moved through a substantial arc, the pins 27 will contact with the balls at the opposite end of each set and the balls then will be moved with the sleeve until their movement is arrested by contact with the pins 33, the movement of the sleeve 23 also being stopped by virtue of the contact between the pins 27 and the end balls of each set. The sleeve 22 is then rotated to move the gripping elements upwardly and outwardly and the shank of the tool is inserted between the gripping elements. The sleeve 22 is then revolved rapidly in the opposite direction to move the gripping elements downwardly and inwardly until they engage the shank of the tool. The sleeve 23 is then rotated to move the shallower portions of the grooves 26 toward the shallower portions of the grooves 32 which action causes the sleeve 23 to move downwardly. Downward movement of the sleeve 23 is permitted by virtue of the play between the ring 19 and the antifriction balls 22' and 25. As the sleeve 23 moves downwardly, the balls 25 contact with the upper face of the ring 19 and cause the latter to move downwardly whereby the gripping elements are clamped tightly about the tool. Since the balls are maintained in positive spaced relation by the retainer plate 35 it will be apparent that contact of the end balls of each set with the pins 27 and 33 will limit the rotation of the sleeve 23 in either direction. In actual practice it is preferred to have the grooves 26 and 32 vary only slightly in depth, throughout their length so that a relatively large rotating movement of the sleeve 23 will effect but a slight longitudinal movement of the gripping elements 14. When so constructed the device permits the tool to be tightly clamped without likelihood of becoming loose in operation, and the clamping action is obtained through manual operation without the use of tools of any kind.

It is to be understood that the form of my invention herewith shown and described is to be taken as a preferred example of the same, and that various changes in the shape, size, and arrangement of parts may be resorted to without departing from the spirit of the invention or the scope of the subjoined claims.

Having described my invention, I claim:

1. A chuck comprising a body portion, means carried thereby for gripping a tool, actuating means for moving said gripping means into loose engagement with the tool, a rotatable sleeve engaging said actuating means, said body portion being provided with an annular extension having its lower face arranged adjacent the upper face of said sleeve, the adjacent faces of said sleeve and said extension being provided with a plurality of concentric grooves of varying depths, and antifriction balls arranged in said grooves.

2. A chuck comprising a body portion, means carried thereby for gripping a tool, actuating means for moving said gripping means into loose engagement with the tool, a rotatable sleeve engaging said actuating means, said body portion being provided with an annular extension having its lower face arranged adjacent the upper face of said sleeve, the adjacent faces of said sleeve and said extension being provided with a plurality of concentric grooves of varying depths, antifriction balls arranged in said grooves, and means disposed in the path of travel of said balls for limiting the rotary movement of said sleeve.

3. A chuck comprising a body portion, gripping elements carried thereby for gripping a tool, rotatable means engaging said gripping elements for moving them into loose engagement with the tool, said rotatable means being capable of limited longitudinal movement, a rotatable sleeve surrounding said body portion and contacting with said rotatable means, said body portion being provided with an annular extension having its lower face arranged adjacent the upper face of said sleeve, the adjacent faces of said sleeve and said extension each being provided with a plurality of similarly arranged concentric grooves of varying depths, and a set of spaced antifriction balls arranged in each groove of said sleeve and extending into the grooves in said extension, said sets of balls being substantially equidistantly spaced.

4. A chuck comprising a body portion, gripping elements carried thereby for gripping a tool, rotatable means engaging said gripping elements for moving them into loose engagement with the tool, said rotatable means being capable of limited longitudinal movement, a rotatable sleeve surrounding said body portion and contacting with said rotatable means, said body portion being provided with an annular extension having its lower face arranged adjacent the upper face of said sleeve, the adjacent faces of said sleeve and said extension each being provided with a plurality of similarly arranged concentric grooves of varying depths, a set of spaced antifriction balls arranged in each groove of said sleeve and extending into the grooves in said extension, said sets of balls being substantially equidistantly spaced, and means arranged in the path of travel of said balls for limiting the rotary movement of said sleeve.

5. A chuck comprising a body portion, a plurality of downwardly converging gripping elements slidably mounted therein and adapted to be clamped about a tool, said elements being provided with relatively high pitch threads, a rotatable ring having internal threads engaging the threads on said gripping elements, said ring being capable of limited longitudinal movement, a slidable and rotatable ring surrounding said body portion above said ring, antifriction elements arranged between said sleeve and said ring, a cap carried by said body portion and having its lower face arranged adjacent the upper face of said sleeve, the adjacent faces of said sleeve and said cap being provided with a plurality of registering concentric grooves, each of said grooves increasing in depth throughout its circumference whereby the high point of each groove is arranged adjacent its low point, the grooves in said cap increasing in depth in a direction opposite that of the grooves in said sleeve, stop pins fixed to said sleeve and said cap between the high and low point of each groove, said pins being substantially equidistantly spaced, a set of spaced antifriction balls arranged in each groove in said sleeve and extending into the grooves in said cap, said sets of balls being substantially equidistantly spaced, and a retainer for said balls mounted between said sleeve and said cap.

In testimony whereof I affix my signature in presence of two witnesses.

HARRY R. McCONNELL.

Witnesses:
RICHMOND T. LACY, Jr.
V. T. ATKINSON.